Sept. 16, 1930.     G. WELDON     1,776,209
SAFETY CATCH FOR MINE CAGES, SKIPS, AND THE LIKE
Filed June 28, 1928     2 Sheets-Sheet 1

Witness:
Arthur Thompson

Inventor:
George Weldon

Sept. 16, 1930.  G. WELDON  1,776,209
SAFETY CATCH FOR MINE CAGES, SKIPS, AND THE LIKE
Filed June 28, 1928  2 Sheets-Sheet 2

Witness:
Arthur Thompson

Inventor:
George Weldon

Patented Sept. 16, 1930

1,776,209

UNITED STATES PATENT OFFICE

GEORGE WELDON, OF SPRINGS, TRANSVAAL, SOUTH AFRICA

SAFETY CATCH FOR MINE CAGES, SKIPS, AND THE LIKE

Application filed June 28, 1928, Serial No. 288,894, and in the Union of South Africa September 3, 1927.

This invention relates to safety catches or safety devices applicable to cages, which are principally used for the transport of men, and to skips and other similar vehicles, used principally for the transport of ore and other material, in the shafts of mines.

The object with which the present invention is designed is to provide a safety catch which will operate gradually to stop or arrest the movement of the cage, skip or the like in the event of it becoming unsuspended in the shaft, due to breakage of the haulage rope or the means whereby it is raised and lowered in the shaft, or for any other reason.

Safety devices which operate suddenly, or without allowing of the gradual absorption of the energy of the falling vehicle and load, cause serious injury to any occupants of the cage or vehicle, as well as serious damage to the vehicle and shaft equipment, which this invention is designed to obviate.

To the attainment of the above object, means are provided which will come into operation gradually on the breaking of the haulage rope or suspension gear, to retard and gradually stop or arrest the movement of the falling vehicle, by providing means which will absorb the energy of the falling vehicle gradually by co-operating with the guides which are provided in the shaft for guiding the vehicle in its ascent and descent of the shaft.

According to my invention I provide a plurality of cutters which are adapted, when the vehicle becomes unsuspended, to be brought into contact with the guides, and by penetrating the same and cutting off shavings or strips, gradually to bring the vehicle to rest. One or a plurality of the cutters may be provided to co-operate with the guides at both sides of the shaft. If a plurality of the cutters be provided to co-operate with the guides at both sides of the shaft, then they are preferably so arranged that they come into action successively from top to bottom on both of the guides. The cutters at each side may be formed on or suitably attached to a part or member pivoted to the vehicle, said members being adapted to be operated automatically, preferably by spring-actuated means, immediately the rope breaks or the vehicle becomes unsuspended. The part or member on which the cutters are formed, or to which they are attached is constructed, for each cutter, with a slot, opening or passage, through which the shavings or strips cut off the guides can pass clear of the cutters.

Means are preferably provided for limiting the extent to which the cutters penetrate the faces of the guides, and said means may be co-operatively combined with the spring actuated operating means of the catch or device.

The invention will be further described with the aid of the accompanying drawings, wherein I illustrate it applied to a mine cage. In the drawings, Fig. 1 is a part-sectional elevation of the device illustrating the parts in their inoperative positions, or the positions they assume when the cage is suspended.

Figure 1:
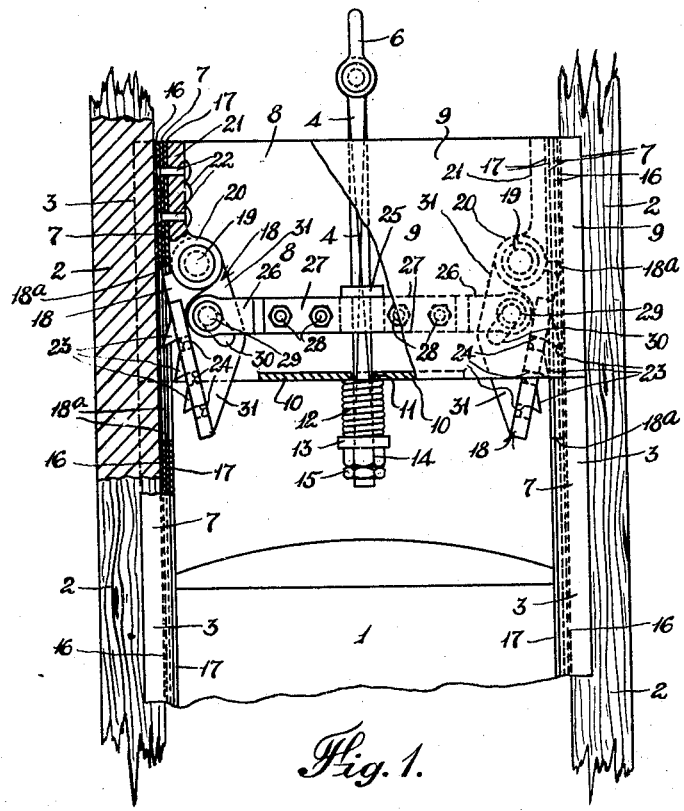

In the embodiment of the invention illustrated in Figs. 1 to 3, the invention is shown applied to a cage or other vehicle 1, traversing ordinary wooden guides 2, provided on two opposite sides of the mine shaft, and the device, as hereinafter described, includes a plurality of the cutters adapted to co-operate with each of the guides 2. 3 represents the usual runners, shoes or slippers which are fixed to the sides of the cage 1 and slidingly engage with the guides 2.

The suspension means includes the kingbolt or drawbolt 4, which serves for making the connection between the cage or vehicle 1 and the end of the haulage rope—not shown—through the medium of a shackle 6.

Figure 3:
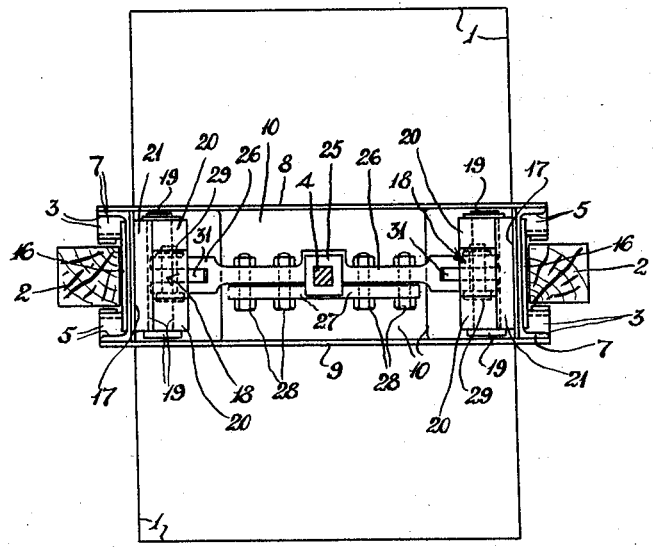
Fig. 3 is a plan of Fig. 1.
Figure 4:
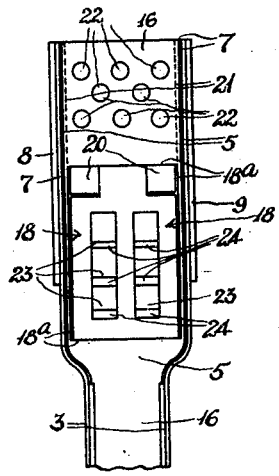
Fig. 4 is a detail side elevation of portions of one of the runners of the vehicle, and the portion of the safety catch in position thereon.

The runners 3 are extended, as indicated at 7, for a suitable distance above the top of the cage 1, and are increased in width in their upper portions, as shown at 5 in Figs. 3 and 4. Said upper portions 7 are connected together at the sides by the two parallel vertical plates 8, 9, which plates, at the bottom, are connected by a horizontal piece or plate 10. The kingbolt 4 is adapted to move through a hole 11 in the plate 10, and around the kingbolt 4, below the plate 10, is arranged a coiled spring 12 which is retained in position on the bolt 4 by means of a washer 13, nut 14 and check nut 15. When the cage or vehicle 1 is suspended and running normally in the shaft, the spring 12 is in compression, so that, upon breakage of the rope or any other portion of the suspension means, said spring 12 operates immediately to draw the kingbolt 4 downwardly in the direction of the top of the cage 1 and actuate the safety catch.

The runners 3 and the extensions 7 are each provided with a lining plate or plates 16, and strengthening back plate 17.

Figure 2:
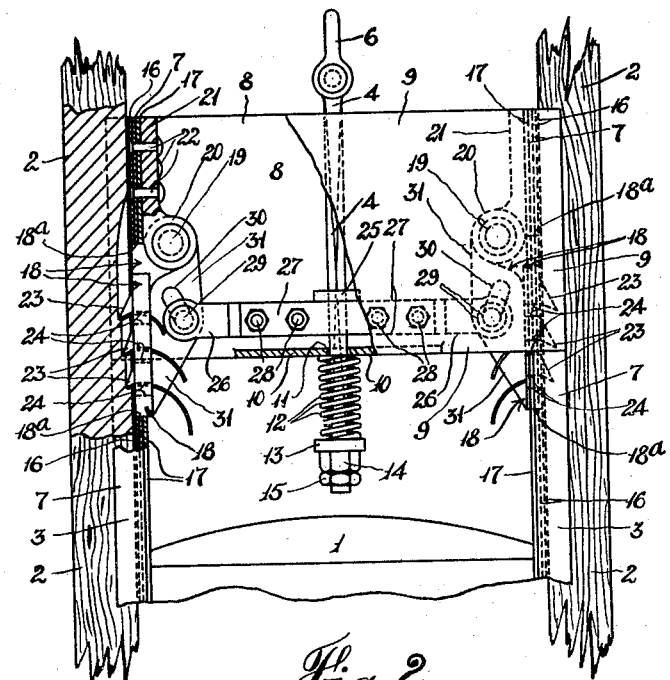
Fig. 2 is a view similar to Fig. 1, illustrating the parts in their operative positions, or the positions they take up to arrest the movement of the vehicle when the rope breaks or the vehicle becomes unsuspended.

The safety catch includes, for each runner 3, a member 18 which is hingedly attached at its upper end, by a hinge pin 19, to perforated lugs 20 on a part or plate 21, which is shown secured by rivets 22 to the lining plate 16, runner extension 7, and back plate 17—see Figs. 1 and 2. A gap or opening 18ª is provided in the plates 16, 17, and the runner extension 7, through which the member 18 can approach the face of the guide 2.

Figures 5, 6:
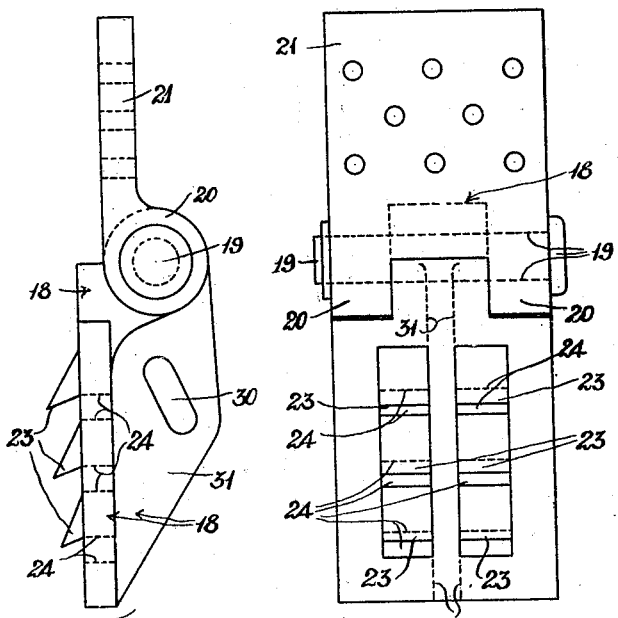
Figs. 5 and 6 are elevations at right angles of certain parts of the safety catch, detached and drawn to an enlarged scale.

Each of the hinged members 18 is constructed or fashioned with a plurality of cutters or the like 23, which are adapted, when the safety catch comes into operation, to come into contact, preferably successively from the top to the bottom, with the faces of the guides 2, and to penetrate the same, and each to cut or plane off a strip or piece of the wood of the guide, as shown in Fig. 2 of the drawings. For this purpose the cutters 23 are shown constructed so as to project from the face of the lowest member 18 to a greater extent from the lowest to the uppermost cutter 23. The cutters 23 are shown formed on the faces of the members 18 in two vertical parallel rows—see Figs. 4 and 6. The said members 18 are constructed with openings, passages or slots 24 below the edge of each of the cutters 23 to allow of the passage therethrough of the shavings cut off by said cutters 23.

The means which connect the kingbolt 4 with the hinged members 18 and serve for operating the latter when the kingbolt 4 is drawn downwards by the action of the spring 12, comprises a collar or the like 25 fixed upon the kingbolt 4, and a crosshead comprising the two parts 26, 27 secured by bolts 28 to the kingbolt 4 below the collar 25, and pins 29 which are carried by the outer bifurcated ends of part 26 of the crosshead and engage in appropriately inclined slots 30 formed in the webs or back parts 31 of the members 18.

When the parts are in the positions in which they are shown in Fig. 1, and the cage is suspended in the shaft, the safety catch is held in the inoperative position, the spring 12 being then in compression between the plate 10 and the washer 13, and the pins 29 being in the upper ends of the slots 30 and holding the cutters 23 clear of the faces of the guides 2.

The parts are brought into the positions in which they are shown in Fig. 2 by the action of the spring 12 drawing the kingbolt 4 downwards immediately the cage 1 becomes unsuspended. The crosshead is moved down with the kingbolt 4, which causes the pins 29 to move down in the slots 30 and so bring the cutters 23 of the members 18, successively from the top to the bottom, into contact with the faces of the guides 2, as previously explained. As each successive cutter 23 projects, in the direction of the guide 2, to a greater extent from the lowermost to the upper most cutter 23, the top cutters first come into contact with the guides 2, and, by penetrating or cutting into the same, draw the next succeeding lower cutters 23 into contact with the faces of the guides 2, and then the lowermost cutters 23. As illustrated in Fig. 2, each of the cutters 23 removes a shaving off the face of the guide 2, the thickness of which will depend upon the extent to which the cutters project outwardly beyond each other, and, in the case of the lowest cutter, beyond the member 18.

The members 18 are retained in the operative position, and the cutters 23 prevented from being thrust away from the guides 2, by the action of the spring 12 on the crosshead 26, 27.

Figure 7:
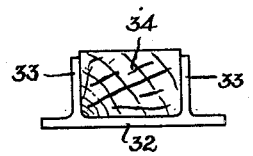
Fig. 7 is a transverse section of a modified form of guide with which the invention can be used.

In Fig. 7 I illustrate one form of construction designed to admit of the safety catch being used on cages or other vehicles which are employed in shafts which are equipped with steel or other metal guides. In this case a composite or built up guide is employed, which may comprise the steel or other metal back portion 32 on which is provided the parallel parts 33, forming the surfaces which are engaged by the runners 3, and the wooden member or timber 34 arranged and secured in the vertical channel or groove between the parts 33, and suitably secured in position therein in such a way as to obviate contact therewith of the cutters or their equivalent of the safety catch, if and when the latter comes into operation. The front surface of the wooden member 34, when the catch comes into operation, is engaged by the cutters 23 in the manner previously explained.

What I claim as my invention and desire to protect by Letters Patent is:—

A safety catch for mine cages, skips and the like, including cutters constructed and arranged so that they penetrate and cut shavings or strips off the guides, and by doing so bring the vehicle to rest, a member for carrying the cutters at each side, which is hingedly attached to the vehicle in front of the guides, spring means which operates automatically to actuate the members carrying the cutters to bring said cutters into contact with the surfaces of the guides should the vehicle become unsuspended in the shaft, a kingbolt, a cross head fixed to the kingbolt and operated by the spring to actuate the members carrying the cutters, and means connecting the ends of the crosshead to the members carrying the cutters, including pins carried by the one and engaging with slots in the other, as set forth.

In testimony whereof I have signed my name to this specification.

GEORGE WELDON.